(12) United States Patent
Cull et al.

(10) Patent No.: US 7,339,332 B2
(45) Date of Patent: Mar. 4, 2008

(54) CHROMA COMPENSATED BACKLIT DISPLAY

(75) Inventors: Brian D. Cull, Glendale, AZ (US);
Dennis M. Davey, Glendale, AZ (US);
Eric D. Ronning, Glendale, AZ (US)

(73) Assignee: Honeywell International, Inc., Morristown, NJ (US)

( * ) Notice: Subject to any disclaimer, the term of this patent is extended or adjusted under 35 U.S.C. 154(b) by 709 days.

(21) Appl. No.: 10/853,484

(22) Filed: May 24, 2004

(65) Prior Publication Data

US 2005/0259439 A1 Nov. 24, 2005

(51) Int. Cl.
*H05B 37/00* (2006.01)

(52) U.S. Cl. .................. 315/291; 315/307; 315/308

(58) Field of Classification Search ........... 315/307, 315/308, 291; 362/611, 612, 613
See application file for complete search history.

(56) References Cited

U.S. PATENT DOCUMENTS

| | | | |
|---|---|---|---|
| 2,850,563 A | 9/1958 | Gretener | |
| 3,794,828 A | 2/1974 | Arplno | |
| 3,805,065 A | 4/1974 | Williams | |
| 3,875,456 A | 4/1975 | Kano et al. | |
| 3,875,473 A | 4/1975 | Lebailly | |
| 4,946,269 A | 8/1990 | Matino et al. | |
| 5,208,462 A | 5/1993 | O'Connor et al. | |
| 5,384,519 A | 1/1995 | Gotoh | |
| 5,532,848 A | 7/1996 | Beretta | |
| 5,813,752 A | 9/1998 | Singer et al. | |
| 5,813,753 A | 9/1998 | Vriens et al. | |
| 5,847,507 A | 12/1998 | Butterworth et al. | |
| 5,852,343 A | 12/1998 | Ravi et al. | |
| 5,929,999 A | 7/1999 | Butterworth | |
| 5,998,925 A | 12/1999 | Shimizu et al. | |
| 6,234,648 B1 | 5/2001 | Börner et al. | |
| 6,513,949 B1 | 2/2003 | Marshall et al. | |
| 6,600,175 B1 | 7/2003 | Baretz et al. | |
| 6,666,587 B2 | 12/2003 | Feldman et al. | |
| 6,680,200 B2 | 1/2004 | Everett | |
| 6,692,136 B2 | 2/2004 | Marshall et al. | |
| 7,119,501 B2 * | 10/2006 | Young | 315/307 |
| 2003/0043107 A1 | 3/2003 | Ruby et al. | |
| 2003/0076056 A1 | 4/2003 | Schuurmans | |
| 2003/0230991 A1 | 12/2003 | Muthu et al. | |

OTHER PUBLICATIONS

Bill Doane, Flat-Panel Display Technology in Russia, Ukraine, and Belarus, WTEC report, 4 pages, May 1995.

(Continued)

*Primary Examiner*—David H. Vu
(74) *Attorney, Agent, or Firm*—Ingrassia Fisher & Lorenz

(57) ABSTRACT

Methods and apparatus are provided for a backlit display with variable luminance and chrominance. The apparatus comprises i groups of LEDs of different colors and one or more sensors optically coupled to the LEDs. The combined light produced by the LEDs is directed to a transmissive liquid crystal display, preferably through a diffusing layer. The sensors monitor the output $S_i$ of each group of LEDs. $S_i$ for each group of LEDs is multiplied by a chrominance determining parameter $K_i$ to obtain $K_i * S_i$ which is then compared to a commanded luminance signal $L_C$ to obtain $L_C - K_i * S_i$, which difference is used to adjust the drive current to each group of LEDs to achieve $L_C$ with the desired chrominance set by $K_i$. By changing $K_i$ and $L_C$ the chrominance and luminescence of the display may be varied and aging effects compensated.

9 Claims, 5 Drawing Sheets

OTHER PUBLICATIONS

Tsunemasa Taguchi, Improved structures and new phosphors yield high-efficiency, UV-driven white-light LEDs,Spie's oemagazine, Oct. 2003, 3 pgs.

Light-Emitting Diodes.WTEC Hyper-Librarian [online]. Published: Dec. 1994 [retrieved Oct. 12, 2005]. Retrieved from Internet: <URL:www.wtec.org/loyola/displays/o4_s3c.htm>.

Led Materials. WTEC Hyper-Librarian [online]. Published: Dec. 1994 [retrieved Oct. 12, 2005]. Retrived from internet <URL:www.wtec.org/loyola/displays/c5_s4.htm>.

J.William Doane, Display Technologies in Russia, Ukraine, and Belarus,National Science Foundation (NSF),Dec. 1994, 2 pages, Loyola College in Maryland.

Sapphire Research and Production Amalgamation.WTEC, Oct. 28, 1993 [online] Retrieved online [retrieved date Oct. 12, 2005]: <URL:www.wtec.org/loyola/displays/ac_sapph.htm>.

PCT International Search Report: PCT/US2005/018090, Applicant Reference No. H0005735-5403, Sep. 20, 2005, EP International Search Authority, 6 pages.

* cited by examiner

CHROMA COMPENSATED BACKLIT DISPLAY

TECHNICAL FIELD

The present invention generally relates to backlit displays, and more particularly to light emitting diode (LED) backlit displays and backlights therefore.

BACKGROUND

Backlights are widely used in connection with transmissive displays such as liquid crystal displays (LCDs). The most common types of backlights are fluorescent lamp backlights. While they are effective they suffer from a number of disadvantages, among which are the need for comparatively high driving voltage and the complexity or difficulty of providing dimming (variable luminescence) and user alterable color (variable chrominance). Also, in applications such as avionics systems where mechanical ruggedness is essential, the comparative fragility of fluorescent backlights can be a significant problem.

Accordingly, it is desirable to provide an improved backlight, backlit display and method, especially apparatus and methods that are compensated for aging and capable of varying luminescence and chrominance. In addition, it is desirable that the backlight and backlit display be simple, rugged and reliable and not require moving shutters or other such mechanical parts. Furthermore, other desirable features and characteristics of the present invention will become apparent from the subsequent detailed description and the appended claims, taken in conjunction with the accompanying drawings and the foregoing technical field and background.

BRIEF SUMMARY

An apparatus is provided for a backlit display with variable luminance and chrominance. The apparatus comprises a backlight coupled to a liquid crystal display. The backlight is formed from i groups of LEDs of different colors, one or more sensors optically coupled to the LEDs, a controller receiving signals $S_i$ from the sensors and drivers coupled to the controller for providing drive current to the LEDs. The sensors, controller, drivers and LEDs form a closed look feedback system that regulates the backlight luminance and chrominance to match desired values set by chrominance parameters $K_i$ and command luminance signal $L_C$. The combined light produced by the LEDs is directed to the transmissive LCD preferably through a diffusing layer. The sensors monitor the output $S_i$ of each group of LEDs. The controller includes first electronic circuits for receiving $S_i$ and chrominance parameter $K_i$ for each group of LEDs and providing $K_i*S_i$. A second electronic circuit in the controller compares $K_i*S_i$ to the commanded luminance signal $L_C$ to obtain $L_C-K_i*S_i$, which difference is used to adjust control signal $D_i$ to the drivers for each group of LEDs to achieve $L_C$ with the desired chrominance set by $K_i$. By changing $K_i$ and $L_C$ the chrominance and luminescence of the display may be varied.

A method is provided for a backlit display with variable luminance and chrominance using i groups of LEDs of different colors and one or sensors optically coupled to the LEDs and electrically coupled through a feedback controller and current drivers to the LEDs. The method comprises, obtaining a quantity $S_i$ proportional to the intensity of light emitted by each group of LEDs, determining $K_i*S_i$ for each group of LEDs where $K_i$ is a chrominance adjustment parameter for each group of LEDs, comparing $K_i*S_i$ to a luminance command signal $L_C$ where $L_C$ determines the overall luminance, and forming current drive control signal $D_i=L_C-K_i*S_i$ for each group of LEDs. In the preferred embodiment, three groups of LEDS are used, one for each primary color.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description. The abbreviations "LED" and "LEDs" are used for "light emitting diode(s)" singular and plural respectively, and the abbreviation "LCD" and "LCDs" are used for "liquid crystal display(s)" singular and plural respectively. The suffixes "R", "G" and "B" are used herein with various reference numbers to identify elements, connections and signals relating to one or the other of the three primary colors red (R), green (G) and blue (B), respectively, and the suffix "W" is similarly used in connection with elements, connections and signals relating to white (W) light. The subscript or suffix "i" is used to stand for any of the colors R, G, B or W, that is, i can take on the values R, G, B, and/or W.

Figure 1:
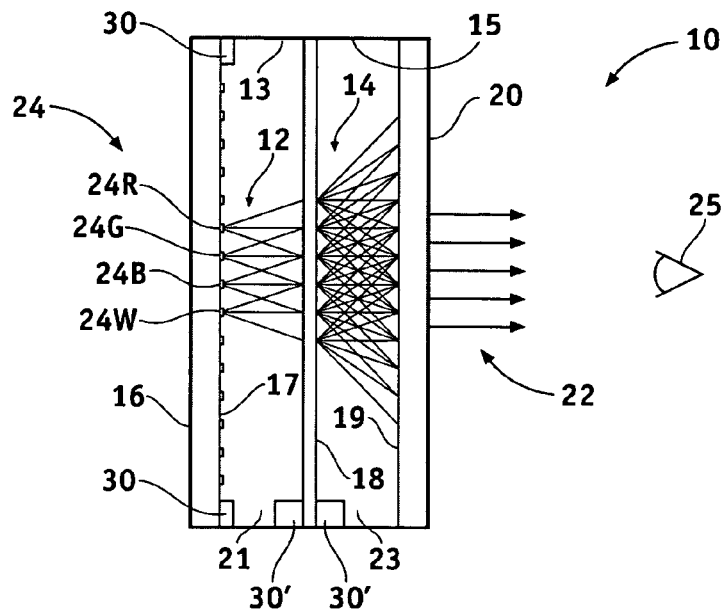
FIG. 1 is a simplified schematic side view of a backlit display according to the present invention, with a near side portion removed to illustrate the interior light paths.

FIG. 1 is a simplified side view of backlit display 10 according to the present invention, with the near side portion removed to illustrate interior construction and light or light rays 12, 14. Display 10 comprises backlight 16, diffuser 18 and LCD 20 emitting patterned light signal 22 toward observer 25 according to whatever character or graphic has been sent to LCD 20. Diffuser 18 is located between backlight 16 and LCD 20. As is well understood in the art, LCD 20 receives electrical signals that locally alter the polarization of light passing through the LCD so that light is either emitted, for example as patterned image 22, or not.

Backlight 16 desirably contains multiple LEDs 24 that emit light or light rays 12 toward diffuser 18. LEDs 24 preferably comprise red LEDs 24R, green LEDs 24G, blue LEDs 24B and (optionally) white LEDs 24W. Diffuser 18 scatters light rays 12 received from LEDs 24 into multiple light rays 14 that are the optical sum of the various colored (or white) light rays received from LEDs 24. Light 14 impinges upon rear face 19 of LCD 20. LCD 20 selectively transmits portions of light 14 to form character or graphic light pattern 22 according to the drive signals that it has received from its associated character generator (not shown). As will be subsequently explained in more detail, by varying the light output from different color LEDs 24 (e.g., 24R, 24G, 24B and/or (optionally 24W) light 14, 22 which is the sum of light 12 emitted by backlight 16 can be varied in color (chrominance) and intensity (luminence). While LEDs 24 are illustrated herein as including red, green, blue and (optionally) white LEDs 24R, 24G, 24B and 24W respectively, this is merely for convenience of explanation and not intended to be limiting. Any combination of LED colors capable of collectively producing the desired color for display image 22 may be used. Display 10 also desirably includes one or more light detectors 30, 30' mounted on or in optical proximity to backlight 16 so as to receive light emitted from one or more LEDs 24. Inward facing surfaces 13, 15, 17 of display 10 are desirably reflective and/or reflective-diffusive rather than absorptive so as to enhance forward propagation of light 12, 14 toward backside 19 of LCD 20.

Figure 2:
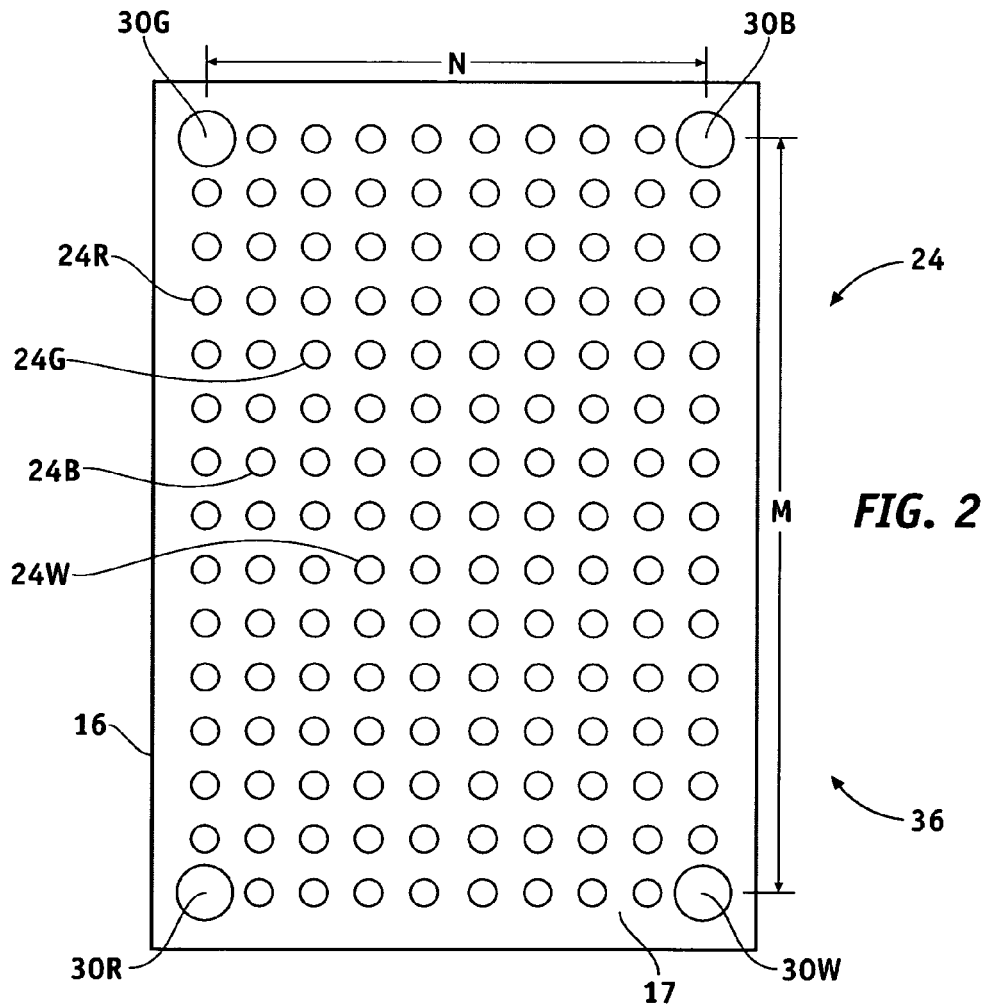
FIG. 2 is a simplified front view of a display backlight according to a first embodiment of the present invention.

FIG. 2 is a simplified plan view of backlight 16 according to a preferred embodiment of the present invention, looking toward interior surface 17. Backlight 16 is composed of N×M matrix 36 of LEDs 24. In the example of FIG. 2, N=10 and M=15, but this is merely for convenience of explanation and not intended to be limiting. Any number of LEDs 24 can be used according to the resolution and size of the LCD display and desired backlight uniformity. In the example of FIG. 2, LEDs 24 comprise approximately (N×M)/3 red LEDs 24R, (N×M)/3 green LEDs 24G and (N×M)/3 blue LEDs 24B randomly distributed in N×M matrix 36, but this is not essential. Some white LEDs may also be included, as for example white LED 24W. Any arrangement of LEDs 24 that provides the desired degree of light and color uniformity may be used. For example and not intended to be limiting, matrix 36 can be square, triangular, concentric circles, spiral, and so forth. Light sensors 30 are conveniently disposed over corresponding LEDs located, for example and not intended to be limiting, in the corners of the N×M LED array, but this is not essential. In the preferred embodiment, each light sensor 30 is conveniently associated with LED 24 of a particular color. For example, light sensor 30R conveniently overlies one of red LEDs 24R, light sensor 30G conveniently overlies one of green LEDs 24G, light sensor 30B,conveniently overlies one of blue LEDs 24B and optional light sensor 30W conveniently overlies one of (optional) white LEDs 24W. Thus, sensor 30R provides signal $S_R$ proportional to overall red light emission, sensor 30G provides signal $S_G$ proportional to overall green light emission, sensor 30B provides signal $S_B$ proportional to overall blue light emission and sensor 30W provides signal $S_W$ proportional to the intensity of light emitted by white LEDs 24W. As noted earlier, inward facing surface 17 of backlight 16 as well as inward facing surfaces 13 and 15 shown in FIG. 1 are desirably reflective or reflective-diffusive, that is, not significantly absorptive. This helps to maximize the amount of light reaching diffuser 18. Light reflected or back-scattered from diffuser 18 is desirably redirected back toward diffuser 18. Optional light sensor 30' located within optical cavities 21 or 23 or both of display 10 can also be used. Sensor 30' detects a light signal related to the combined output of all LEDs 24 of backlight 16. Sensors 30, 30' are described in greater detail in connection with FIGS. 6A-B.

Figure 3:
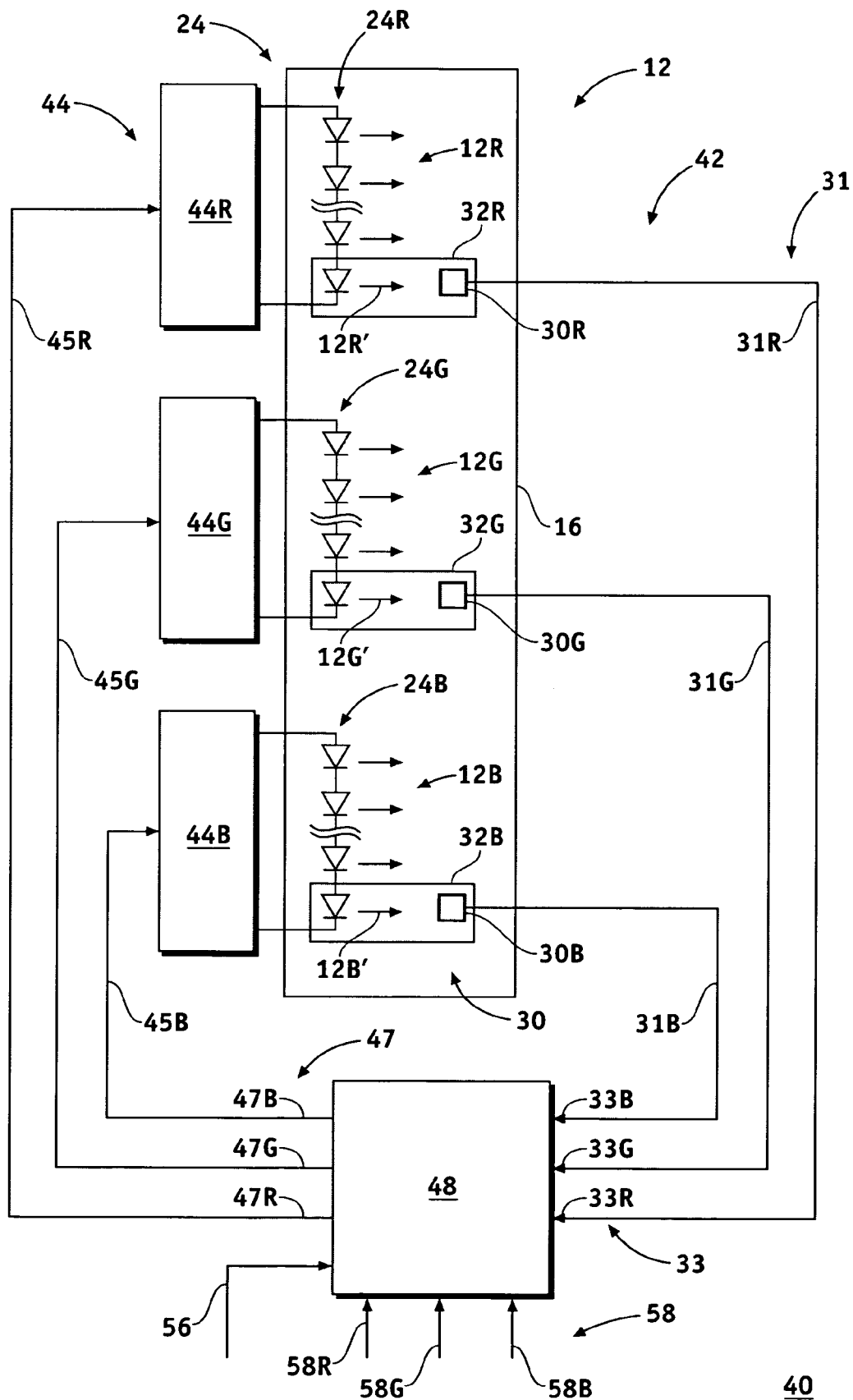
FIG. 3 shows a simplified electrical schematic block diagram of a control system for the display backlight of FIGS. 1-2, according to a first embodiment of the present invention.

FIG. 3 shows simplified electrical schematic block diagram 40 of feedback control system 42 for LEDs 24 of backlight 16 according to a first embodiment of the present invention utilizing, for example, red, green and blue LEDs. As noted above, the suffixes "R", "G", "B" indicate elements, signals and connection related respectively to red, green, and blue emitters. Control system 42 comprises sensors 30, controller 48 and LED drivers 44. Driver 44R is coupled to output 47R of controller 48 via lead 45R and supplies a controlled current to series-coupled red LEDs 24R in response to control signals received from controller 48. Driver 44G is coupled to output 47G of controller 48 via lead 45G and supplies a controlled current to series-coupled green LEDs 24G in response to control signals received from controller 48. Driver 44B is coupled to output 47B of controller 48 via lead 45B and supplies a controlled current to series coupled blue LEDs 24B in response to control signals received from controller 48. Sensors 30$i$ are conveniently positioned within housings 32$i$ so that sensor 30R receives portion 12R' of red light 12R from red LEDs 24R, sensor 30G receives portion 12G' of green light 12G from green LEDs 24G, and sensor 30B receives portion 12B' of blue light 12B from LEDs 24B. Sensor 30R is coupled via lead 31R to input 33R of controller 48 and provides to controller 48 a measure of red light output 12R from red LEDs 24R of backlight 16. Sensor 30G is coupled via lead 31G to input 33G of controller 48 and provides to controller 48 a measure of green light output 12G from green LEDs 24G of backlight 16. Sensor 30B is coupled via lead 31B to input 33B of controller 48 and provides to controller 48 a measure of blue light output 12B from blue LEDs 24B of backlight 16. Controller 48 also has input 56 for setting the overall luminance level of backlight 16 and chrominance control inputs 58 for setting the color mix. Inputs 58 desirably include one or more separate inputs 58R, 58G, 58B for varying the amount of one or more of the colors making up light 12.

The following equations describe the LED drive function provided by system 42:

$$D_R = L_C - K_R * S_R, \quad [1]$$

$$D_G = L_C - K_G * S_G, \quad [2]$$

$$D_B = L_C - K_B * S_B, \quad [3]$$

or more generally $$D_i = L_C - K_i * S_i, \quad [4]$$

where i=R, B, G (or other colors) and where
  $D_R$=Red LED drive control signal,
  $D_G$=Green LED drive control signal,
  $D_B$=Blue LED drive control signal,
  $L_C$=Luminescence command signal,
  $K_R$=Red LED color calibration coefficient,
  $K_G$=Green LED color calibration coefficient,
  $K_B$=Blue LED color calibration coefficient,
  $S_R$=Red color sensor output,
  $S_G$=Green color sensor output, and
  $S_B$=Blue color sensor output.

These equations are implemented by system 42 of FIG. 3, as explained in more detail in connection with FIG. 4.

Figure 4:
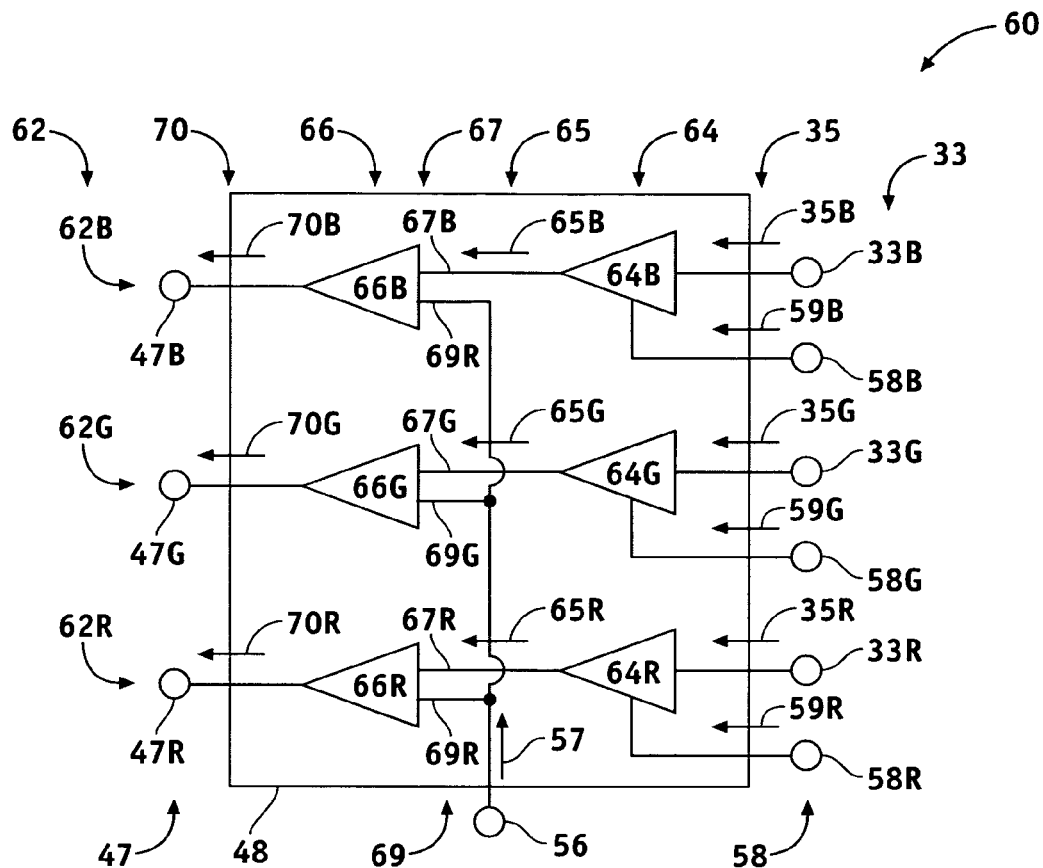
FIG. 4 is a simplified electrical schematic block diagram of the controller portion of the control system of FIG. 3, showing further details.

FIG. 4 shows simplified electrical schematic block diagram 60 providing further details of controller 48 of system 42 of FIG. 3, according to a preferred embodiment. Controller 48 conveniently comprises three channels, one for each primary color; channel 62R controls red LEDs 24R, channel 62G controls green LEDs 24G and channel 62B controls blue LEDs 24B. The three channels are substantially identical and will be discussed together without use of suffixes "R", "G" and "B", which will be understood as applied to the individual channels. Controller 48 is a feedback controller, that is, it receives signals 35 (e.g., $S_i$) from sensors 30 and, (a) optionally adjusts signals 35 according to chromaticity reference signals 59 (e.g., $K_i$) on inputs 58 to produce chrominance adjusted feedback signals 65 (e.g., $K_i*S_i$), and (b) compares chrominance adjusted feedback signals 65 (e.g., $K_i*S_i$) to reference or luminance commanded signal 57 (e.g., $L_C$) to produce LED driver control signals 70 (e.g., $D_i$). Signals 70 are sent to drivers 44 thereby causing LEDs 24 to produce the color mix (chromaticity) and brightness (luminance) that will reduce the difference between chrominance adjusted feedback signals 65 and luminance signal 70 to be substantially zero. Persons of skill in the art will understand that a small offset is always present in such a differential feedback system. For convenience of explanation it is neglected here.

Each channels 62 has first variable gain amplifier or level shifter 64 and second differential amplifier 66, wherein amplifiers 64, 66 are series coupled between control input 33 and output 47 leading to driver 44. First input 33 of amplifier 64 receives feedback signal 35 (e.g., $S_i$) from corresponding photo-sensor 30. Second input 58 of amplifier 64 receives optional chromaticity adjustment signal 59. In a preferred embodiment signal 59 conveniently adjusts the gain of amplifier or level shifter 64, that is, has the effect of multiplying the signal $S_i$ received from sensor 30 by an adjustable constant $K_i$ that may be different for each group of LEDs (each value of "i"). Thus, output signal 65 from amplifier 64 is $K_i*S_i$. Channels 62R, 62G, 62B generate intermediate feedback signals 65R, 65G, 65B given by $K_R*S_R$, $K_G*S_G$, $K_B*S_B$ respectively, where subscripts R, G, B identify the individual colors being handled in the present example and where $K_R$, $K_G$ and $K_B$ are determined by the value of chrominance adjustment signals 59R, 59G, 59B at inputs 58R, 58G, 58B respectively. Individual chromaticity adjustment signals 59R, 59G, 59B going to channels 62R, 62G, 62B respectively, are optional and may be the same or different for each channel 62R, 62G, 62B, or may be supplied to only one channel or to only two channels or to all three channels, depending upon the range of colors desired for light 12. Signals 59 allow the color provided by backlight 16 to be varied to meet the needs of the system designer or user. This is explained more fully in connection with FIG. 5.

Output signal 65 of first amplifier 64 is fed to first input 67 of second amplifier 66. Second amplifier 66 has second input 69 that receives luminance command ($L_C$) signal 57 from external input 56 of controller 48. In the preferred embodiment, $L_C$ signal 57 is common to all three channels 62R, 62G. 62B, but this is not essential and not intended to be limiting. Command luminance signal (CLS) 57 allows the designer or user to set the overall light output (luminance) of backlight 16 by varying the overall drive levels provided by controller 48 to drivers 44 and thence to LEDs 24. In the preferred embodiment, changing signal 57 causes more or less current to flow through all LEDs 24. In general, light output from an LED tracks the current through the device so that increasing the current substantially uniformly through all LEDs causes a change in luminance without a significant change in color. If LEDs of different colors have different current-luminance responses, this can be taken into account either in controller 48 or drivers 44 or both, so that signal 57 can control overall luminance without a significant change in color. Second amplifier 66 is desirably a difference amplifier that causes output 70 to increase (or decrease) until resulting adjusted feedback signal 65 (i.e., $K_i*S_i$) appearing at input 67 of amplifier 66 substantially equals $L_C$ signal 57 at input 69 of amplifier 66. It will be appreciated based on the description herein, that the present invention can compensate for aging effects, so as to maintain the predetermined luminance and chrominance. This is a particular feature of the present invention.

Figure 5:
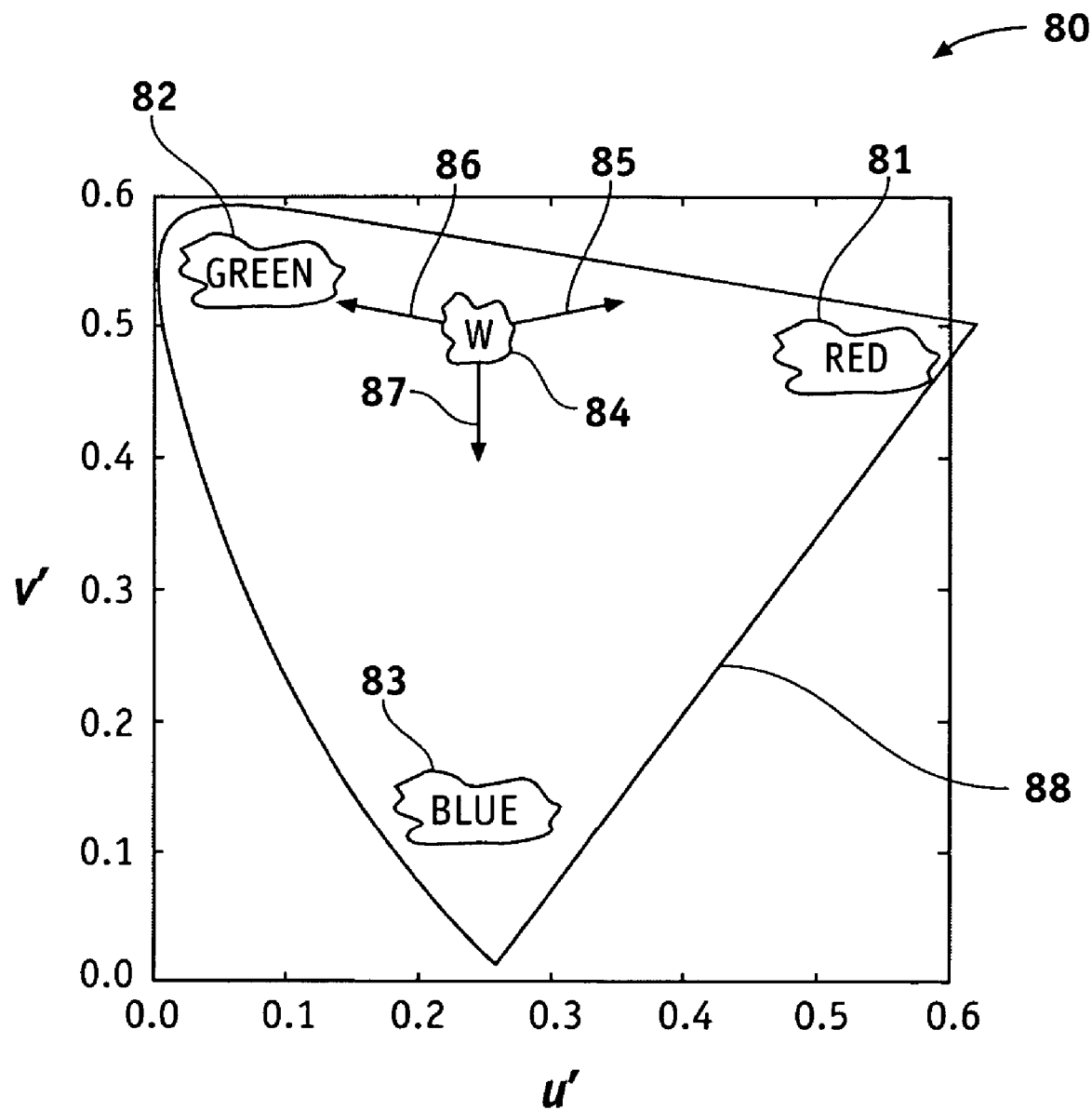
FIG. 5 is a 1976 u', v' CIE Chromaticity Diagram wherein color variations available from an LED backlight of the present invention are illustrated.

FIG. 5 shows 1976 u', v' CIE Chromaticity Diagram 80 illustrating the color variations available from LED backlight 16 according to the present invention. Such Chromaticity Diagrams are well known in the art and are described, for example by G. J. and D. G. Chamberlin in Color: *Its Measurement, Computation and Application,* Heyden and Sons Press Ltd, 1980, pages 60 ff. The human visible color spectrum is contained within outline 88. Region 81 is the approximate locus of primary red (R), region 82 the approximate locus of primary green and region 83 the approximate locus of primary blue. White regions 84 is at about u'~0.22 and v'~0.48. Intermediate colors have other u', v' values. Arrows 85, 86, 87 illustrate respectively the effect on color of varying chrominance parameters $K_R$, $K_G$, and $K_B$ in equations [1] through [3]. Thus, by varying $K_R$, $K_G$, and $K_B$, most colors within Chromaticity Diagram 80 can be obtained. This is a particular feature of the present invention.

Figure 6A:
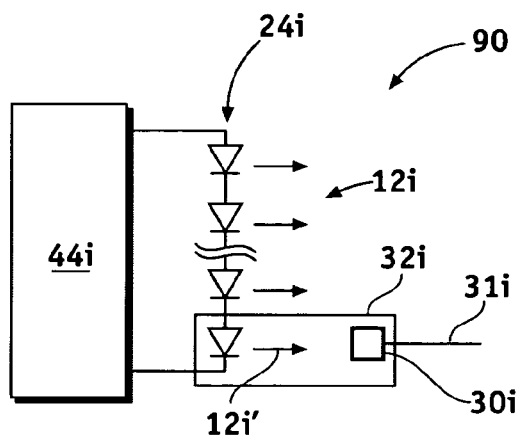
FIGS. 6A-B are simplified schematic diagrams illustrating light sensors coupled to LED backlights according to several embodiments of the present invention.
Figure 6B:
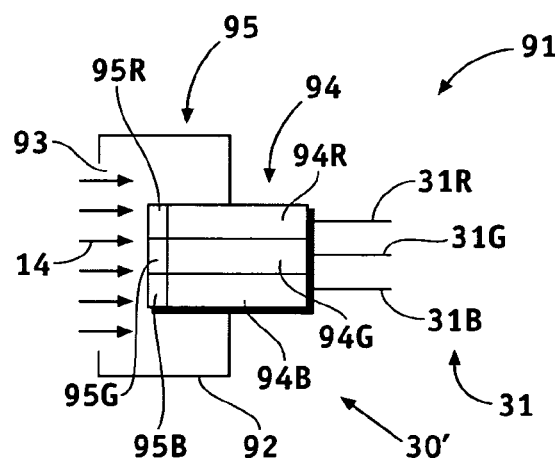

FIGS. 6A-B are simplified schematic diagrams 90, 91 illustrating light sensors 30, 30' coupled to LED backlight 16 to measure light emission therefrom according to different embodiments of the present invention. Referring now to FIG. 6A, diagram 90 illustrates the arrangement utilized in FIG. 3, where individual sensor 30$i$ is mounted within housing 32$i$ coupled to and desirably enclosing one of LEDs 24$i$, where i identifies the LEDs of the same color. Sensor 30$i$ receives light 12$i$40 from the single LED within housing 32$i$, which is proportional to light 12$i$ emitted by series connected same color LEDs 24$i$. This arrangement is simple and rugged and provides chrominance signal $S_i$ for each color i=R, G, B, W, etc. A disadvantage is that one LED for each color is used to obtain chrominance signal $S_i$ and therefore does not contribute to light output 12 of backlight 16 directed toward LCD 20. Where a large number of LEDs 24 are used in backlight 16, this is not a significant penalty.

Schematic diagram 91 of FIG. 6B illustrates an alternate arrangement whereby sensor 30' is provided in optical cavity 21 or 23 or both of display 10 (see FIG. 1) and receives a portion of light 12 emitted from substantially all of LEDs 24 rather than from just one or two or three, etc. Sensor 30' comprises housing 92 with opening 93 oriented so as to receive light 12 from backlight 16 if placed in cavity 21 or receive light 14 if placed in cavity 23. For purposes of explanation and not intended to be limiting, it is assumed in the discussion that follows that sensor 30' is located in cavity 23 and receives light 14. Located within housing 92 are three sensors 94 having thereon color filters 95. Thus, red color filter 95R overlies sensor 94R so that sensor 94R provides on output 31R, signal $S_R$ proportional to the red content of light 14. Similarly, green color filter 95G overlies sensor 94G and blue filter 95B overlies sensor 94B so that signals $S_G$ and $S_B$ appear on output leads 31G, 31B associated with sensors 94G, 94B respectively. Advantages of the arrangement of FIG. 6B are that all of LEDs 24 contribute to light output 12, 14 and only one triple-sensor pickup is needed. A potential disadvantage is that if stray light from outside display 10 is coupled into cavity 21 or 23 it may be detected by sensor 30' thereby potentially causing a measuring error. However, the stray light must be significant compared to the light being emitted by backlight 16 for this to be troublesome. Therefore, the arrangement of either FIG. 6A or 6B is useful.

Figure 7A:
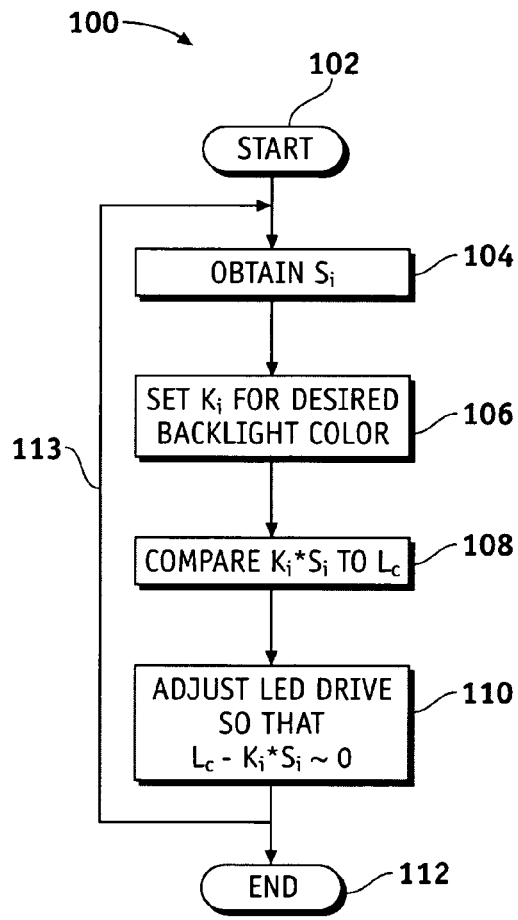
FIGS. 7A-B are simplified flow diagrams of the method of the present invention for providing backlight of a predetermined luminescence and chrominance, according to the present invention.
Figure 7B:
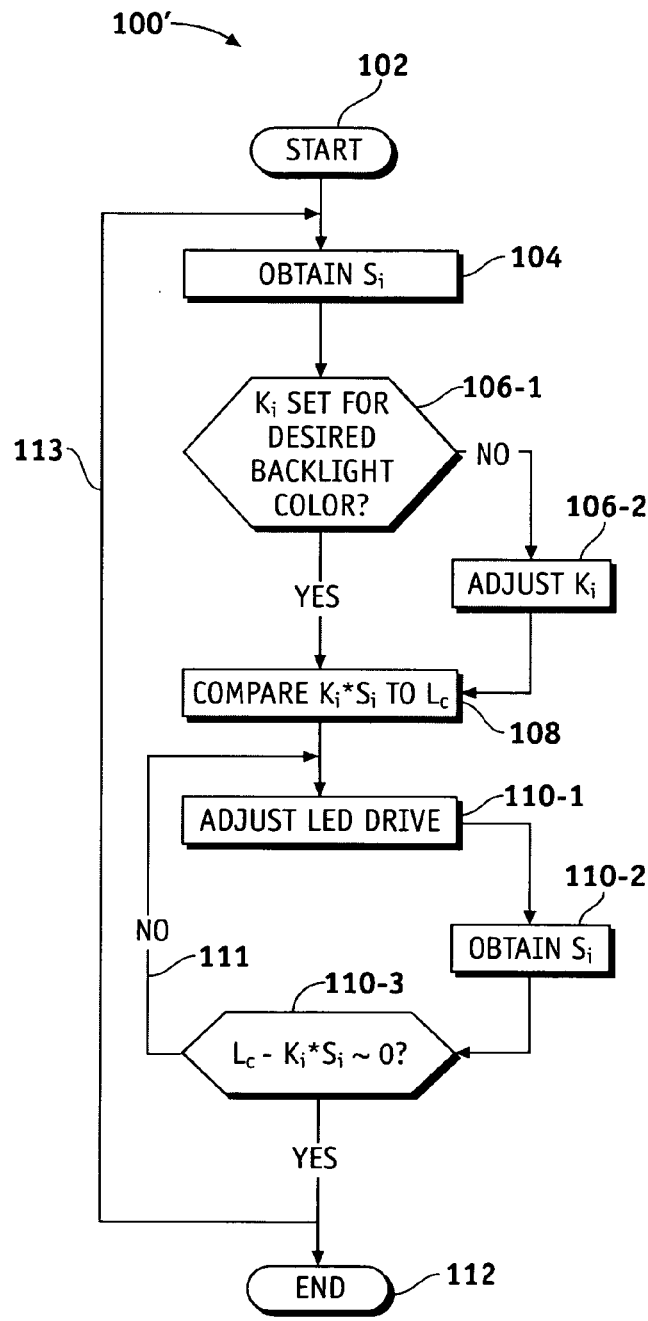

FIGS. 7A-B are simplified flow diagrams of method 100, 100' of the present invention for providing backlight of a predetermined luminance and chrominance. FIG. 7A shows method 100 and FIG. 7B shows method 100' which differ in detail. The same reference numbers are used for analogous steps in both method 100 and 100'. Method 100, 100' begins with START 102 that desirably occurs on system power-up, that is, when display 10 is energized, or at least backlight 16 is energized. In step 104, sensors 30, 30' are interrogated to provide chromaticity outputs $S_i$, where i corresponds to one or the other of the LED colors (e.g., R, B, G, W, etc.). Signals $S_i$ are fed, for example, to inputs 33$i$ of controller 48. In step 106 of method 100, the $K_i$ values needed to obtain the desired backlight chrominance are set, as for example, via inputs 58$i$ of controller 48 (e.g., see FIG. 4). In step 108 the resulting values $K_i*S_i$ are compared with luminance command signal $L_C$, and in step 110 LED drive control signals $D_i$ supplied to LED drivers 44$i$ (see FIG. 4) are adjusted so that $K_i*S_i$ and $L_C$ are approximately equal (abbreviated as $L_C-K_i*S_i \sim 0$ in FIGS. 7A-B). Once substantial equality has been achieved so that backlight 16 is emitting the correct color and luminance, method 100 proceeds to END 112. However, persons of skill in the art will understand based on the description herein that method 100, 100' may continually loop back to START 102 as shown by path 113 as long as power is applied to display 10 and/or backlight 16 so as to maintain light emission therefrom at the desired intensity and color and respond to LED aging or any adjustments that may, from time to time, be made by the user. The method of FIG. 7A is conveniently implemented using an analog type controller such as is illustrated in FIGS. 3-4.

FIG. 7B differs from FIG. 7A in how steps 106 and 110 are carried out. Method 100' of FIG. 7B is convenient for digital control of display 10 and backlight 16 wherein queries may be performed to determine whether the adjustable parameters $L_C$ and $K_i$ are currently at the desired values or not. For example, step 106 of method 100 is replaced in method 100' by query 106-1 wherein it is determined whether or not the current values of $K_i$ correspond to the backlight color desired by the user. If the outcome of query 106-1 is YES (TRUE) then the current value of $K_i$ is used in step 108 where $K_i*S_i$ is compared to $L_C$. If the outcome of query 106-1 is NO (FALSE) then method 100' proceeds to step 106-2 where $K_i$ is adjusted to the correct value for the color desired by the user, and this modified value of $K_i$ is used in step 108. Similarly, in method 100' step 110 is divided into sub-steps 110-1, 110-2 and 110-3. In step 110-1 the LED drive is adjusted up or down depending upon the sign of the difference obtained in COMPARE step 108. In subsequent step 110-2, sensors 30, 30' are re-interrogated to obtain the resulting new value of Si. This value of $S_i$ is used in query 110-3 to determined whether or not the condition $L_C-K_i*S_i \sim 0$ is now satisfied. If the outcome of query 110-3 is NO (FALSE) then method 100' loops back as shown by path 111 until the outcome of query 110-3 is YES (TRUE), whereupon method 100' proceeds to END 112 or loops back to START 102 as shown by optional path 113 as previously discussed. Persons of skill in the art will understand based on the description herein how to implement method 100, 100'

While at least one exemplary embodiment has been presented in the foregoing detailed description, it should be appreciated that a vast number of variations exist. For example, and not intended to be limiting, while FIGS. 3 and 4 are illustrated for three colors R, G, B persons of skill in the art will understand based on the description herein that white LEDs 24W may also be used and, for example, additional white channel 62W provided in controller 48 responsive to sensors 30W coupled to white LEDs 24W. Such white channel may respond to luminance signal 57 and/or to an independent luminance signal 57' coupled only to white channel 62W, depending upon the needs of the user. While the present invention has been described in terms of using primary color LEDs, e.g., red (R), green (G) and blue (B) and, optionally, white (W), the present invention is not limited merely to LEDs of those colors. Any color LEDs can be used that are capable when their light output is combined of achieving the desired color for the display. Thus, R, G, B and W LEDs are merely preferred examples and not limitations of the present invention. Further, while three so-called primary colored groups of LEDs are used in the preferred embodiment this is not essential. Less than three groups of different colored LEDs may be used and still achieve user variable luminance although with more limited user variable chrominance, provided that the available chrominance range can achieve the desired color for the display. For example, if a particular display requires only blends of red and greed colors, there is no need to include blue LEDs, or if the display only requires white and red blends, there is no need to include green and blue LEDs since red and while LEDs are sufficient. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. An electro-optical apparatus, comprising:
a first group of LEDs configured to emit light of a first color, a second group of LEDs configured to emit light of a second color, and a third group of LEDs configured to emit light of a third color;
one or more sensors optically coupled to the LEDs and configured to measure quantities $S_1$, $S_2$ and $S_3$ proportional to the intensities of light emitted from the first, second, and third groups of LEDs respectively;
electronic circuitry coupled to the one or more sensors and the groups of LEDs for receiving $S_1$, $S_2$ and $S_3$, $K_1$, $K_2$, and $K_3$, and $L_C$, and determining $$D_1 = L_C - K_1*S_1,$$

$$D_2 = L_C - K_2*S_2, \text{ and}$$

$$D_3 = L_C - K_3*S_3,$$

where $D_1$, $D_2$, and $D_3$ determine current drive levels for the first, second, and third group of LEDs respectively, $L_C$ is a commanded luminance signal determining overall luminance produced by the LEDs and $K_1$, $K_2$, and $K_3$ are chrominance parameters for determining the relative light output from the first, second, and third group of LEDs respectively.

2. The apparatus of claim 1 further comprising an LCD region receiving combined light output of the first, second and third groups of LEDs.

3. The apparatus of claim 2 further comprising an optical diffuser located between the LEDs and the LCD region.

4. The apparatus of claim 1 wherein the LEDs of each group are series coupled.

5. The apparatus of claim 1 wherein the one or more sensors comprise first, second and third sensors receiving combined light from the first, second and third groups of LEDs, and each of the sensors has thereon a different color filter selective to light from one of the first, second and third groups of LEDs, so as to produce $S_1$, $S_2$ and $S_3$.

6. The apparatus of claim 1 wherein the one or more sensors comprise a first sensor coupled to an LED only of the first group for providing $S_1$ and a second sensor coupled to an LED only of the second group for providing $S_2$ and a third sensor coupled to an LED only of the third group for providing $S_3$.

7. A method for operating a backlit display with variable luminance and chrominance using i groups of LEDs of different colors and one or more sensors optically coupled to the LEDs and electrically coupled through a feedback controller and current drivers to the LEDs, comprising:

obtaining from the one or more sensors values $S_i$ proportional to the intensity of light emitted by each group of LEDs;

determining $K_i*S_i$ for each group of LEDs where $K_i$ is a chrominance adjustment parameter for each group of LEDs;

comparing $K_i*S_i$ to a luminance command signal $L_C$ where $L_C$ determines the overall luminance; and adjusting current drive to each group of LEDs so that $L_C - K_i*S_i \sim 0$.

8. The method of claim 7 wherein the adjusting step comprises:

(a) adjusting the current drive to each group of LEDs depending upon the sign of the difference $L_C - K_i*S_i$;

(b) obtaining a new value of $S_i$;

(c) determining if $L_C - K_i*S_i \sim 0$ and if YES (TRUE) fixing the drive current for each group of LEDs and if NO (FALSE) repeating steps (a)-(c) until the determining if $L_C - K_i*S_i \sim 0$ step is true.

9. The method of claim 7 wherein the determining step comprises:

(a) determining whether a current value of $K_i$ corresponds to a desired chrominance; and (b) if YES (TRUE) using the current value of $K_i$ to determine $K_i*S_i$; and (c) if NO (FALSE) adjusting $K_i$ to correspond to the desired chrominance; and (d) then determining $K_1*S_i$.

* * * * *